(12) United States Patent
Peter

(10) Patent No.: US 12,498,256 B2
(45) Date of Patent: Dec. 16, 2025

(54) INDUCTIVE PROXIMITY SENSOR FOR THE DETECTION OF AN OBJECT AND METHOD OF DETECTING AN OBJECT

(71) Applicant: SICK AG, Waldkirch (DE)

(72) Inventor: Andreas Peter, Waldkirch (DE)

(73) Assignee: SICK AG, Waldkirch (DE)

( * ) Notice: Subject to any disclaimer, the term of this patent is extended or adjusted under 35 U.S.C. 154(b) by 174 days.

(21) Appl. No.: 18/620,487

(22) Filed: Mar. 28, 2024

(65) Prior Publication Data
US 2024/0328831 A1    Oct. 3, 2024

(30) Foreign Application Priority Data
Mar. 29, 2023    (DE) .......................... 102023107946.8

(51) Int. Cl.
*G01D 5/22*    (2006.01)
*G01B 7/02*    (2006.01)
(Continued)

(52) U.S. Cl.
CPC ........... *G01D 5/2208* (2013.01); *G01B 7/023* (2013.01); *G01D 11/245* (2013.01); *H03K 17/9512* (2013.01); *H03K 17/952* (2013.01)

(58) Field of Classification Search
CPC ...... G01D 5/22; G01D 5/2208; G01D 11/245; G01D 11/24; G01B 7/023; G01B 7/02;
(Continued)

(56) References Cited

U.S. PATENT DOCUMENTS

| | | | |
|---|---|---|---|
| 2002/0053908 A1 | 5/2002 | Candy | |
| 2016/0076912 A1* | 3/2016 | Pólik | G06N 3/0499 |
| | | | 706/26 |
| 2018/0045538 A1* | 2/2018 | Thoss | G01D 5/204 |

FOREIGN PATENT DOCUMENTS

| | | |
|---|---|---|
| DE | 102011004538 A1 | 8/2012 |
| DE | 102016115015 B4 | 3/2018 |

* cited by examiner

*Primary Examiner* — Son T Le
(74) *Attorney, Agent, or Firm* — Nath, Goldberg & Meyer; Jerald L. Meyer

(57) ABSTRACT

An inductive proximity sensor and a method for the detection of an object having at least one coil, wherein at least one transmitted current pulse can be applied to the coil by a control and evaluation unit and the control and evaluation unit is configured to output an object determination signal, wherein the control and evaluation unit is configured to scan at least one induced voltage pulse that has been generated by the transmitted current pulse at the coil in a plurality of sections from or after the time of the application of the transmitted current pulse and to form scan values, whereby the voltage pulse is digitized, wherein the control and evaluation unit is configured to evaluate the scan values for an object detection of a metallic object, wherein the control and evaluation unit is configured to scan the transmitted current pulse that has been generated at the coil in at least two sections from or after the time of the application of the transmitted current pulse and to form transmitted current scan values, wherein the control and evaluation unit is configured to determine a rise in the current increase of the transmitted current pulse from the transmitted current scan values, and the control and evaluation unit is configured to end the transmitted current pulse in dependence on the detected increase of the transmitted current pulse.

16 Claims, 5 Drawing Sheets

Figure 1:
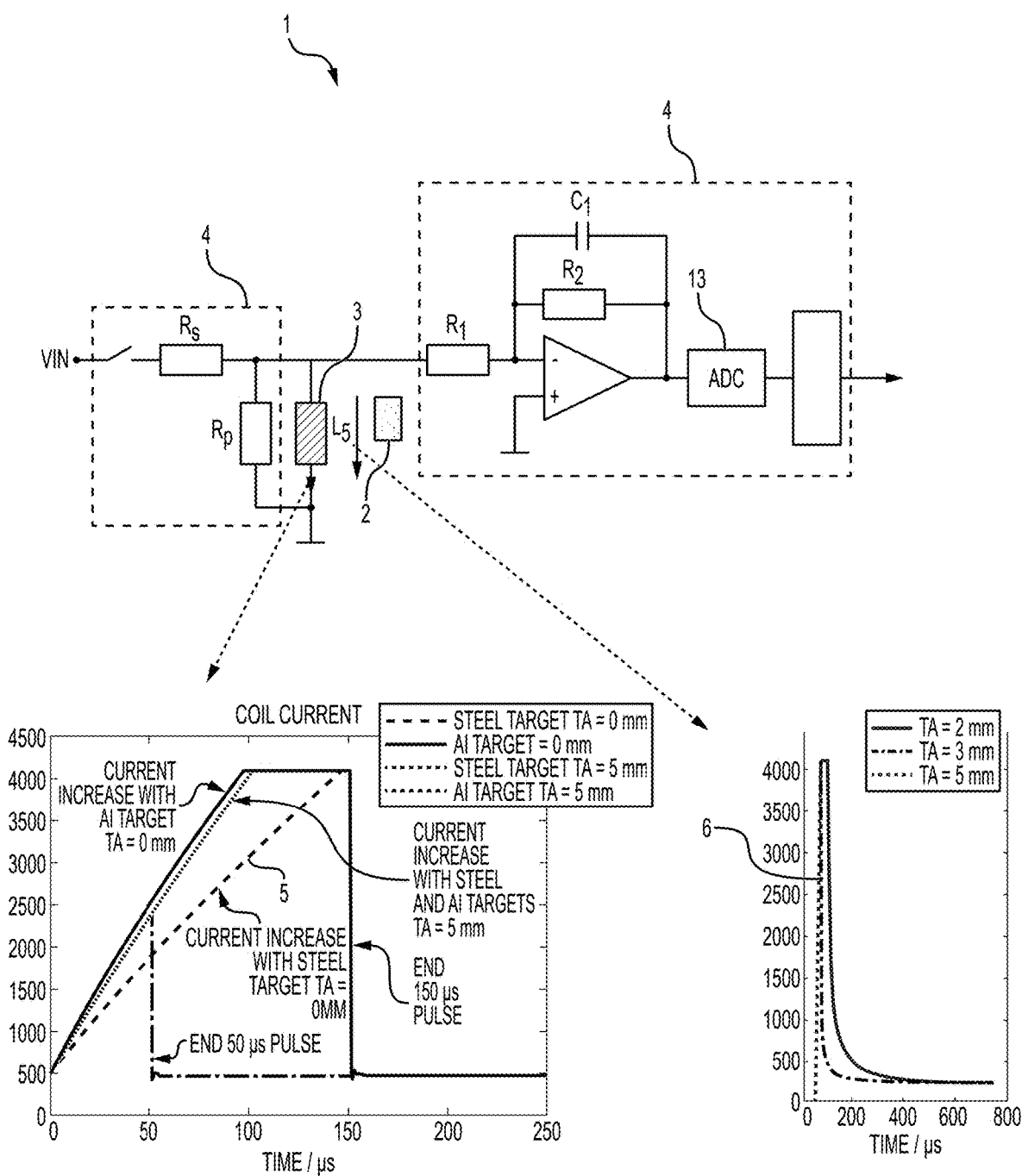

(51) Int. Cl.
*G01D 11/24* (2006.01)
*H03K 17/95* (2006.01)

(58) Field of Classification Search
CPC .. H03K 17/9512; H03K 17/95; H03K 17/952; G01V 3/10
See application file for complete search history.

INDUCTIVE PROXIMITY SENSOR FOR THE DETECTION OF AN OBJECT AND METHOD OF DETECTING AN OBJECT

The present invention relates to an inductive proximity sensor for the detection of an object and to a method of detecting an object.

Inductive proximity sensors are used as contactless switches in a harsh environment. An important quality feature in this respect is the maximum achievable switching distance.

Apart from a high switching distance, a switching frequency that is as high as possible is required by the market. With inductive sensors that work in accordance with the pulse principle, the pulse frequency determines the maximum possible switching frequency of the inductive sensor. The distance of the consecutive excitation pulses is normally selected such that the respective response to the excitation pulse of the metallic object to be detected can fully abate. The length of the response pulse is almost constant as long as the object is at a sufficiently large distance from the inductive sensor. However, if the object distance is very small, the response pulse is greatly extended. Since this case cannot be precluded in the application, the time duration between two excitation pulses has to be correspondingly long.

A maximum possible switching frequency of the inductive sensor is determined by the maximum possible abatement time of the response pulse when the object is directly in front of the inductive sensor. If the excitation is delayed until the received signal has abated, an accumulation of the eddies in the target can arise, which can result in changes to the aligned switching threshold.

US 2002/0053908 A1 discloses the evaluation of received pulses of different lengths.

An object of the invention comprises increasing the switching frequency of the inductive proximity sensor to a physically possible maximum without having to apply an alternating coil current.

The object is satisfied by an inductive proximity sensor for the detection of an object having at least one coil, wherein at least one transmitted current pulse can be applied to the coil by a control and evaluation unit and the control and evaluation unit is configured to output an object determination signal, wherein the control and evaluation unit is configured to scan at least one induced voltage pulse that has been generated by the transmitted current pulse at the coil in a plurality of sections from or after the time of the application of the transmitted current pulse and to form scan values, whereby the voltage pulse is digitized, wherein the control and evaluation unit is configured to evaluate the scan values for an object detection of a metallic object, wherein the control and evaluation unit is configured to scan the transmitted current pulse that has been generated at the coil in at least two sections from or after the time of the application of the transmitted current pulse and to form transmitted current scan values, wherein the control and evaluation unit is configured to determine a rise in the current increase of the transmitted current pulse from the transmitted current scan values, and the control and evaluation unit is configured to end the transmitted current pulse in dependence on the detected increase of the transmitted current pulse.

The object is further satisfied by a method of detecting an object using an inductive proximity sensor having at least one coil, wherein at least one transmitted current pulse is applied to the coil by a control and evaluation unit and the control and evaluation unit outputs an object determination signal, wherein the control and evaluation unit scans at least one induced voltage pulse that has been generated by the transmitted current pulse at the coil in a plurality of sections from or after the time of the application of the transmitted current pulse and forms scan values, whereby the voltage pulse is digitized, wherein the control and evaluation unit evaluates the scan values for an object detection of a metallic object, wherein the control and evaluation unit scans the transmitted current pulse that has been generated at the coil in at least two sections from or after the time of the application of the transmitted current pulse and forms transmitted current scan values, wherein the control and evaluation unit determines a rise in the current increase of the transmitted current pulse from the transmitted current scan values, and the control and evaluation unit ends the transmitted current pulse in dependence on the detected increase of the transmitted current pulse.

The heart of the present invention comprises already recognizing whether a very long response pulse or voltage pulse is to be expected during the excitation pulse or transmitted current pulse if the object is located very closely in front of the inductive proximity sensor, for example. If this case is recognized, the transmitted current pulse is ended earlier than in normal operation to prevent too long a voltage pulse from being induced by the object. An evaluation of the voltage pulse or received pulse and the generation of the object determination signal or switching signal can take place without change since the length of the shortened transmitted current pulse is defined and is known to the control and evaluation unit. Changed timings or alignment points can, for example, be stored on the control and evaluation unit of the inductive proximity sensor and can be applied.

The recognition of too long a voltage pulse or response pulse to be expected can e.g. take place by the analysis of the current of the transmitted current pulse of the transmitter coil.

If an object is recognized directly in front of the sensor front of the inductive proximity sensor, provision can be made by a shortened excitation pulse or transmitted current pulse that the response pulse or voltage pulse does not become unnecessarily long.

The evaluation of the excitation pulse or transmitted current pulse has the great advantage that a very long response pulse or voltage pulse is recognized and can be suppressed in advance. The switching frequency of the inductive proximity sensor can take place using the physically possible maximum.

In a further development of the invention, the higher the rise in the current increase of the transmitted current pulse, the shorter the transmitted current pulse is switched by the control and evaluation unit.

The length of the transmitted current pulse is thereby set in dependence on the rise in the current increase. The steeper the increase of the transmitted current pulse of the front leading edge of the transmitted current pulse, the shorter the transmitted current pulse is set in that the transmitted current is switched off, for example.

The length of the transmitted current pulse can, for example, be regulated in dependence on the rise in the current increase. The control and evaluation unit has a regulator for this purpose, for example.

In a further development of the invention, the higher the increase of the current increase of the transmitted current pulse, the longer the transmitted current pulse is switched by the control and evaluation unit.

The length of the transmitted current pulse is thereby set in dependence on the rise in the current increase. The lower the increase of the transmitted current pulse of the front leading edge of the transmitted current pulse, the longer the transmitted current pulse is set in that the transmitted current is switched off later, for example.

The length of the transmitted current pulse can, for example, be regulated in dependence on the rise in the current increase. The control and evaluation unit has a regulator for this purpose, for example.

In a further development of the invention, the length of the transmitted current pulse amounts to between 5 µs and 750 µs. The length of the transmitted current pulse in particular amounts to between 50 µs and 150 µs.

In normal operation, for example, the inductive proximity sensor is, for example, operated with a transmitted current pulse of a length of 150 µs. If an object here comes very close to the sensor or the sensor front, the response pulse or voltage pulse extends impermissibly long and would have not yet abated after, for example, 500 µs. If, however, the case is already recognized at the start of the excitation of the transmitted current pulse, the transmitted current pulse is shortened to, for example, 50 µs, the received pulse or voltage pulse becomes correspondingly shorter and has already completely abated, for example, at least after 500 µs, the next transmitted current pulse or excitation pulse can thus be transmitted earlier.

In a further development of the invention, the control and evaluation unit is configured to carry out an integration of the transmitted current pulse. The control and evaluation unit has an integrator for this purpose. The control and evaluation unit in particular has a digital integrator to carry out a digital integration of the transmitted current pulse. The increase of the transmitted current pulse can be indirectly detected and determined by an evaluation of the integration or of the integrator.

In a further development of the invention, the inductive proximity sensor has a further coil that is coupled by a transformer to the coil, with the further coil serving for the measurement of the coil current of the coil. A galvanic decoupling is thereby provided, whereby no direct pickup has to be provided at the coil.

In a further development of the invention, the control and evaluation unit is configured to evaluate the coil current of the coil during the transmitted current pulse and, starting from the evaluation, the control and evaluation unit is configured to determine the metallic material of the object.

The metallic material of the object can, for example, be determined by an evaluation and determination of the increase of the transmitted current pulse by the control and evaluation unit.

The transmitted current pulse thus increases more steeply with an object of aluminum than with an object of steel. If an object comes very close to the inductive proximity sensor, the steepness changes. For example, the steepness becomes less with an object of steel and, for example, the steepness becomes greater with an object of aluminum. It is therefore detected whether there is a difference with respect to the current increase when the object is spaced apart from the inductive sensor.

In a further development of the invention, the inductive proximity sensor has a first coil as the transmitter coil and a second coil as the receiver coil, wherein the transmitted current pulse flows through the transmitter coil and the resulting pulse voltage of the voltage pulse is measurable at the receiver coil.

This advantageous embodiment comprises using a transmitter coil and a receiver coil instead of a single coil. In this respect, the transmitted current pulse is only applied to the transmitter coil and the voltage pulse is measured at the receiver coil. This further development makes it possible to optimize the signal to noise ratio with the aid of the winding relationships.

In a further development of the invention, the control and evaluation unit is configured to evaluate the scan values of at least two consecutive voltage pulses for a formation of the object detection signal of a metallic object.

An important point of the further development comprises the scan values of a plurality of voltage pulses that are recorded after one another being combined with one another.

Very high frequency information can thereby also be acquired from the voltage pulse that would be lost due to the filter effect of an analog integration.

Furthermore, filtering can be greater due to the large number of available scan points, whereby a signal to noise ratio is improved and an amplitude resolution increases.

In a further development of the invention, an analog to digital converter is provided for the scanning of the voltage pulse or a time to digital converter is provided for the scanning of the transmitted current pulse.

The analog to digital converter is directly connected to a microcontroller, for example. The analog to digital converter is a part of the control and evaluation unit. The control and evaluation unit can, for example, have a microcontroller, a digital signal processor, a digital signal controller, or similar.

In a further development, a time to digital converter is provided for the scanning of the voltage pulse. A so-called time to digital converter is an electronic assembly that measures very short time intervals and converts them into digital values. Time intervals from 1 nanosecond onward can be measured, for example.

In a further development of the invention, an amplifier is provided between the coil and an analog to digital converter for impedance conversion and level adaptation.

The amplifier is, for example, deployed between the receiver coil and the analog to digital converter. The use of the amplifier has at least three advantages.

First, an impedance conversion can be carried out using the amplifier so that the receiver coil can be tapped at high ohms. No current or only a very small current thereby flows in the receiver coil and no retroactive effect on the object occurs. In addition, the scanning circuit in the input of the analog to digital converter does not generate any interference on the reception voltage when an amplifier is used as a buffer.

Second, the amplifier can also simultaneously be used as an anti-aliasing filter for the analog to digital converter if the amplifier has a low pass behavior.

The third advantage comprises the amplifier being configured to carry out a buffering and a pre-amplification, whereby the signal to noise ratio and thus ultimately also the maximum achievable switching distance is improved.

In a further development of the invention, at least the coil and the control and evaluation unit are arranged in a metal housing, with at least one end face having the coil having a metallic end face that is connected to a metallic jacket.

The mechanical robustness, namely an impact resistance, a pressure resistance or a resistance to abrasion or scratching of the sensor is thereby increased. The chemical resistance is furthermore improved by the metallic housing. For example, on the use of stainless steel, for example of V4A, there is a resistance to salt water and to most cleaning agents. The sensor head is hermetically sealed due to the connection.

The metallic end face can in this respect, for example, be connected with material continuity by welding, by screws, by pressing, or by a comparable connection technique.

In a further development of the invention, the control and evaluation unit is configured to make use of a plurality of scan values from at least one voltage pulse to calculate an object property.

Which metal the detected object is composed of can, for example, thereby be determined. It can, for example, be distinguished whether the object is composed of steel, stainless steel, aluminum or, for example, non-ferrous metal.

In a further development of the invention, the control and evaluation unit is configured to carry out a digital integration in a time window from or after the start of the voltage pulse or current pulse to generate the object detection signal.

The object determination signal in this respect itself includes information on the distance of the object so that these distance data can be processed by a downstream controller. The distance signal can in this respect be the object determination signal itself. Provision can, however, also be made that an additional distance signal to the object determination signal is output.

The digital scanning and the digital post-processing of the pulses also allows the use of different integration windows, in part also overlapping integration windows, on the same voltage pulse.

In a further development of the invention, the control and evaluation unit is configured to evaluate a pulse level, a pulse length, and/or zero crossings of the voltage pulse, whereby the control and evaluation unit is configured to form the object determination signal.

The switching distance can thereby be further increased since the named characteristics of the voltage pulse deliver features to carry out a plurality of evaluation processes.

Figure 2:
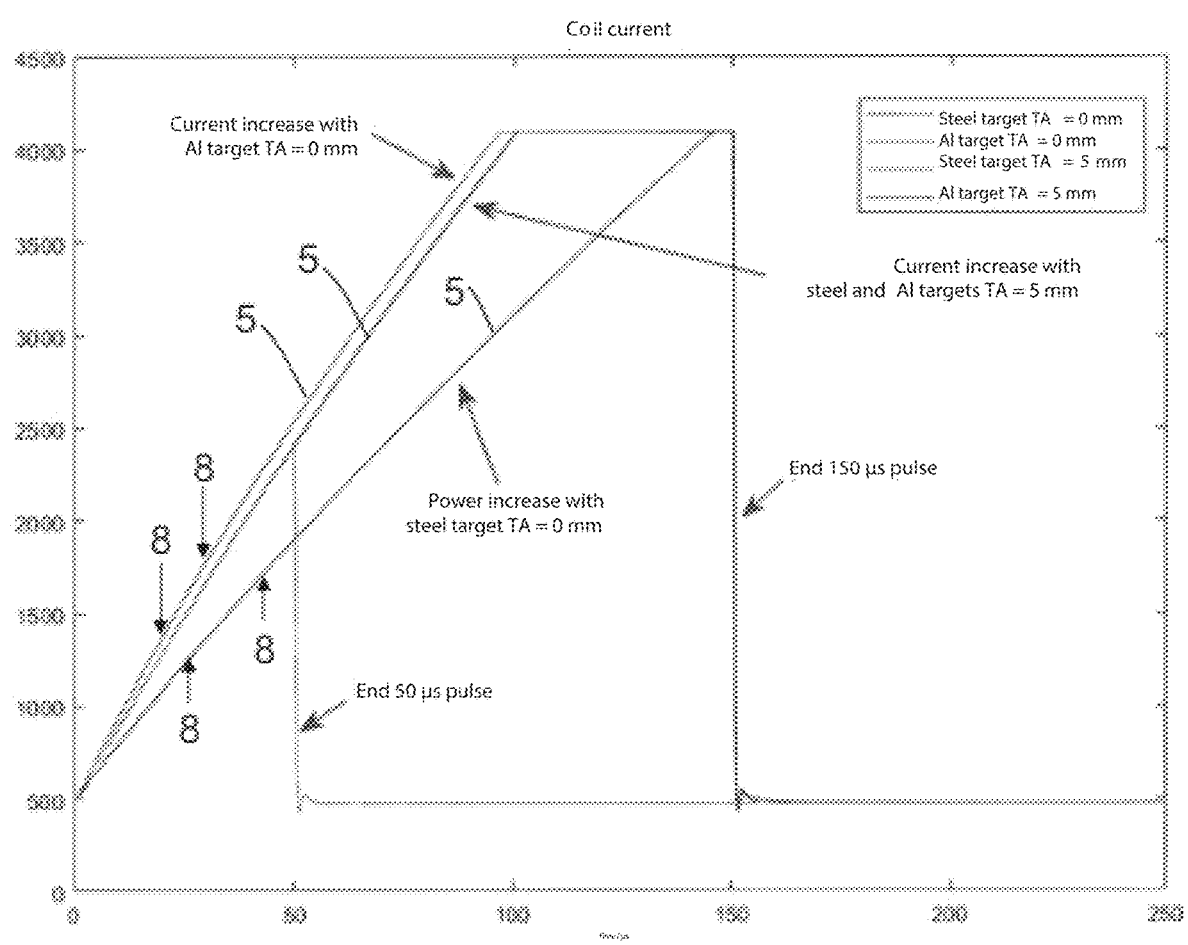
Figure 3:
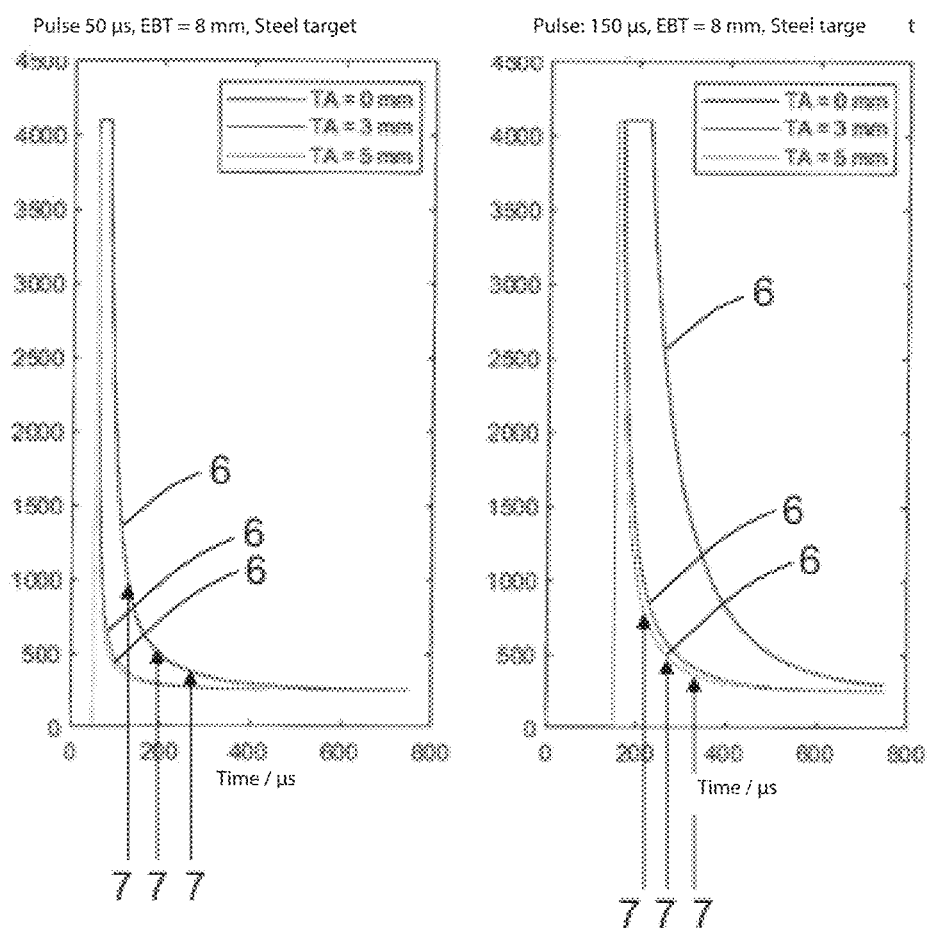
Figure 4:
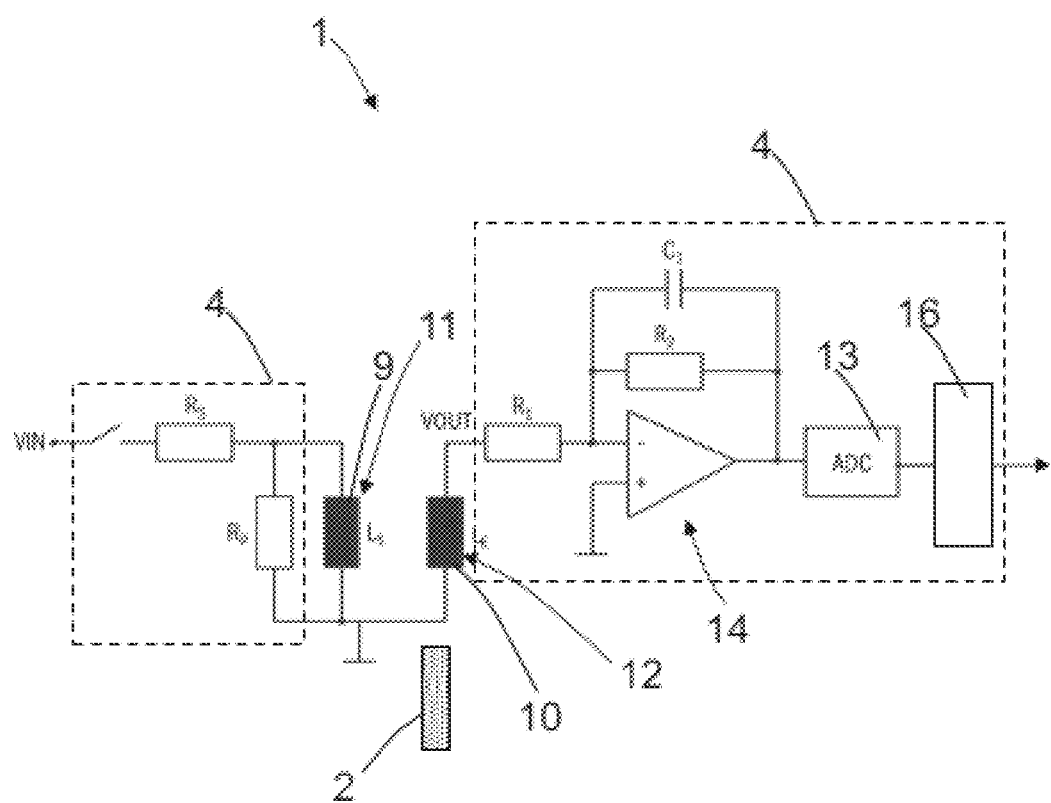
Figure 5:
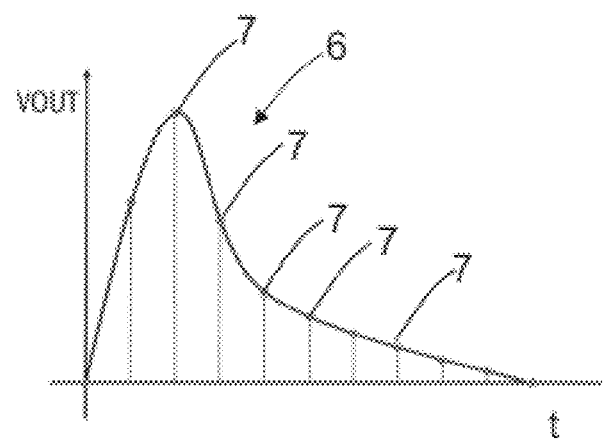
Figure 6:
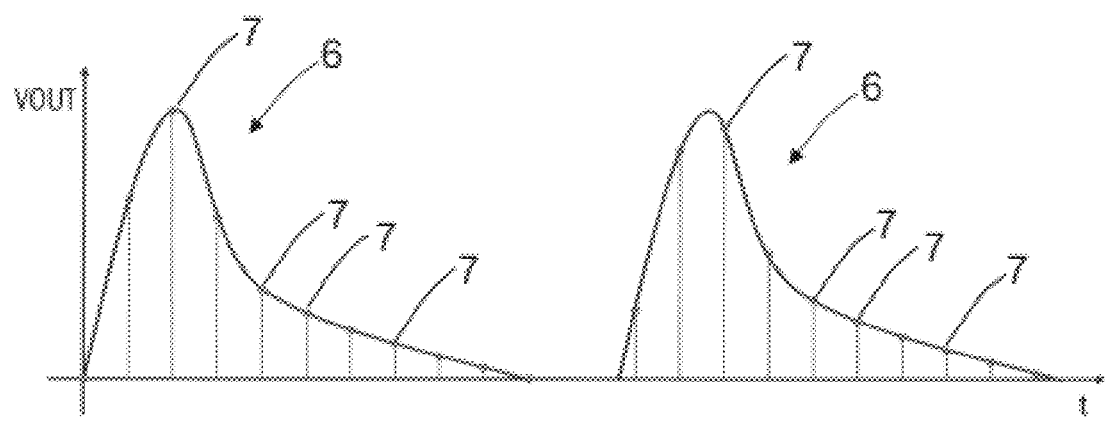

The invention will also be explained in the following with respect to further advantages and features with reference to the enclosed drawing and embodiments. The Figures of the drawing show in:

FIG. 1 an inductive sensor and a representation of the transmitted current pulse and of the voltage pulse;
FIG. 2 different transmitted current pulses;
FIG. 3 different voltage pulses;
FIG. 4 an inductive sensor;
FIG. 5 a voltage pulse;
FIG. 6 two consecutive voltage pulses.

In the following Figures, identical parts are provided with identical reference numerals.

FIG. 1 shows an inductive proximity sensor 1 for the detection of an object 2 having at least one coil 3, wherein at least one transmitted current pulse 5 can be applied to the coil 3 by a control and evaluation unit 4 and the control and evaluation unit 4 is configured to output an object determination signal, wherein the control and evaluation unit 4 is configured to scan at least one induced voltage pulse 6 that has been generated by the transmitted current pulse 5 at the coil 3 in a plurality of sections from or after the time of the application of the transmitted current pulse 5 and to form scan values, whereby the voltage pulse 6 is digitized, wherein the control and evaluation unit 4 is configured to evaluate the scan values for an object detection of a metallic object 2, wherein the control and evaluation unit 4 is configured to scan the transmitted current pulse 5 that has been generated at the coil 3 in at least two sections from or after the time of the application of the transmitted current pulse 5 and to form transmitted current scan values, wherein the control and evaluation unit 4 is configured to determine a rise in the current increase of the transmitted current pulse 5 from the transmitted current scan values, and the control and evaluation unit 4 is configured to end the transmitted current pulse 5 in dependence on the detected increase of the transmitted current pulse 5.

FIG. 2 shows examples of different transmitted current pulses 5. The transmitted current pulses are recorded for objects 2 of steel and for objects of aluminum, in each case at a distance of 0 mm and 5 mm from the coil 3 of the inductive proximity sensor.

FIG. 3 shows examples of different voltage pulses 6. In the left image of FIG. 3, the length of the transmitted current pulse amounted to 50 µs at a distance of 0 mm, 3 mm or 5 mm of an object of steel. In the right image of FIG. 3, the length of the transmitted current pulse amounted to 150 µs at a distance of 0 mm, 3 mm or 5 mm of an object of steel.

A detection is already made in accordance with FIG. 2 during the excitation pulse or transmitted current pulse 5 whether a very long response pulse or voltage pulse 6 (in accordance with FIG. 3) is to be expected if the object 2 is located very closely in front of the inductive proximity sensor 1, for example. If this case is recognized, the transmitted current pulse 5 is ended earlier than in normal operation to prevent too long a voltage pulse 6 from being induced by the object 2. An evaluation of the voltage pulse 6 or received pulse and the generation of the object determination signal or switching signal can take place without change since the length of the shortened transmitted current pulse 5 is defined and is known to the control and evaluation unit 4. Changed timings or alignment points can, for example, be stored on the control and evaluation unit 4 of the inductive proximity sensor 1 and can be applied.

The recognition of too long a voltage pulse 6 or response pulse to be expected can e.g. take place by the analysis of the current of the transmitted current pulse 5 of the transmitter coil 3.

If an object 2 is recognized directly in front of the sensor front of the inductive proximity sensor 1, provision can be made by a shortened excitation pulse or transmitted current pulse 5 that the response pulse or voltage pulse 6 does not become unnecessarily long.

For example, the higher the rise in the current increase of the transmitted current pulse 5, the shorter the transmitted current pulse 5 is switched by the control and evaluation unit 4.

The length of the transmitted current pulse 5 is thereby set in dependence on the rise in the current increase. The steeper the gradient of the transmitted current pulse 5 of the front leading edge of the transmitted current pulse 5, the shorter the transmitted current pulse 5 is set in that the transmitted current is switched off, for example.

The length of the transmitted current pulse 5 can, for example, be regulated in dependence on the rise in the current increase. The control and evaluation unit 4 has a regulator for this purpose, for example.

The length of the transmitted current pulse, for example, amounts to between 30 µs and 150 µs. The length of the transmitted current pulse in accordance with FIG. 2 in particular amounts to between 50 µs and 150 µs.

In normal operation, for example, the inductive proximity sensor 1 is for example, operated with a transmitted current pulse of a length of 150 µs. If an object here comes very close to the sensor or the sensor front, the response pulse or voltage pulse 6 extends impermissibly long and would have not yet completely abated after, for example, 500 µs. If, however, the case is already recognized at the start of the excitation of the transmitted current pulse 5, the transmitted current pulse 5 is shortened to, for example, 50 μs, the received pulse or voltage pulse 6 becomes correspondingly shorter and has already completely abated, for example, at least after 500 μs, the next transmitted current pulse 5 or excitation pulse can thus be transmitted earlier.

The control and evaluation unit 4 is configured to carry out an integration of the transmitted current pulse 5, for example. The control and evaluation unit 4 has an integrator for this purpose. The control and evaluation unit 4 in particular has a digital integrator to carry out a digital integration of the transmitted current pulse 5. The increase of the transmitted current pulse 5 can be indirectly detected and determined by an evaluation of the integration or of the integrator.

The inductive proximity sensor 1, for example, has a further coil that is coupled by a transformer to the coil 3, with the further coil serving for the measurement of the coil current of the coil 3. A galvanic decoupling is thereby provided, whereby no direct pickup has to be provided at the coil 3.

For example, the control and evaluation unit 4 is configured to evaluate the coil current of the coil 3 during the transmitted current pulse 5 and, starting from the evaluation, the control and evaluation 4 unit is configured to determine the metallic material of the object 2.

The metallic material of the object 2 can, for example, be determined by an evaluation and determination of the increase of the transmitted current pulse 5 by the control and evaluation unit 4.

In accordance with FIG. 2 the transmitted current pulse 5 thus increases more steeply with an object 2 of aluminum than with an object 2 of steel.

For example, the inductive proximity sensor 1 in accordance with FIG. 4 has a first coil 9 as the transmitter coil 11 and a second coil 10 as the receiver coil 12, wherein the transmitted current pulse 5 flows through the transmitter coil 11 and the resulting pulse voltage of the voltage pulse 6 is measurable at the receiver coil 12.

This advantageous embodiment comprises using a transmitter coil 11 and a receiver coil 13 instead of a single coil 3. In this respect, the transmitted current pulse 5 is only applied to the transmitter coil 11 and the voltage pulse 6 is measured at the receiver coil 12. This further development makes it possible to optimize the signal to noise ratio with the aid of the winding relationships.

For example, the control and evaluation unit 4 is configured to evaluate the scan values of at least two consecutive voltage pulses 6 in accordance with FIG. 6 for a formation of the object detection signal of a metallic object 2. In this respect, for example, the scan values 7 of a plurality of voltage points 6 that are recorded after one another are combined with one another. FIG. 5 shows a single voltage pulse 6 with scan values 7.

Filtering can be greater due to the large number of available scan values 7, whereby a signal to noise ratio is improved and an amplitude resolution increases.

In accordance with FIG. 4, for example, an analog to digital converter 13 is provided for the scanning of the voltage pulse or a time to digital converter is provided for the scanning of the voltage pulse 6.

The analog to digital converter 13 is directly connected to a microcontroller 16, for example. The analog to digital converter 13 is a part of the control and evaluation unit 4.

The control and evaluation unit 4 can, for example, have a microcontroller 16, a digital signal processor, a digital signal controller, or similar.

For example, in accordance with FIG. 4 an amplifier 14 is provided between the coil 3 and an analog to digital converter 13 for impedance conversion and level adaptation.

The amplifier 14 is, for example, deployed between the receiver coil 12 and the analog to digital converter 13.

For example, at least the coil 3 and the control and evaluation unit 4 are arranged in a metal housing, with at least one end face having the coil having a metallic end face that is connected to a metallic jacket.

The metallic end face can in this respect, for example, be connected with material continuity, by welding, by screws, by pressing or by a comparable connection technique.

For example, the control and evaluation unit 4 is configured to make use of a plurality of scan values 7 from at least one voltage pulse 6 to calculate an object property.

Which metal the detected object 2 is composed of can, for example, thereby be determined. It can, for example, be distinguished whether the object 2 is composed of steel, stainless steel, aluminum or, for example, non-ferrous metal. For example, the control and evaluation unit 4 is configured to carry out a digital integration in a time window from or after the start of the voltage pulse 6 or current transmitted current pulse 5 to generate the object determination signal.

The object determination signal in this respect, for example, itself includes information on the distance of the object 2 so that these distance data can be processed by a downstream controller. The distance signal can in this respect be the object determination signal itself. Provision can, however, also be made that an additional distance signal to the object detection signal is output.

The digital scanning and the digital post-processing of the pulses also allows the use of different integration windows, in part also overlapping integration windows, on the same voltage pulse 6.

For example, the control and evaluation unit 4 is configured to evaluate a pulse level, a pulse length, and/or zero crossings of the voltage pulse 6, whereby the control and evaluation unit 4 is configured to form the object determination signal.

REFERENCE NUMERALS

1 inductive proximity sensor
2 object
3 coil
4 control and evaluation unit
5 transmitted current pulse
6 voltage pulse
7 scan values
8 transmitted current scan values
9 first coil
10 second coil
11 transmitter coil
12 receiver coil
13 analog to digital converter
14 amplifier
16 microcontroller

The invention claimed is:

1. An inductive proximity sensor for the detection of an object having at least one coil, wherein at least one transmitted current pulse can be applied to the coil by a control and evaluation unit and the control and evaluation unit is configured to output an object determination signal, wherein the control and evaluation unit is configured to scan at least one induced voltage pulse that has been generated by the transmitted current pulse at the coil in a plurality of sections from or after the time of the application of the transmitted current pulse and to form scan values, whereby the voltage pulse is digitized, and wherein the control and evaluation unit is configured to evaluate the scan values for an object detection of a metallic object, wherein the control and evaluation unit is configured to scan the transmitted current pulse that has been generated at the coil in at least two sections from or after the time of the application of the transmitted current pulse and to form transmitted current scan values, wherein the control and evaluation unit is configured to determine a rise in the current increase of the transmitted current pulse from the transmitted current scan values, and the control and evaluation unit is configured to end the transmitted current pulse in dependence on the detected increase of the transmitted current pulse.

2. The inductive proximity sensor in accordance with claim 1, wherein the higher the higher the rise in the current increase of the transmitted current pulse, the shorter the transmitted current pulse is switched by the control and evaluation unit.

3. The inductive proximity sensor in accordance with claim 1, wherein the higher the rise in the current increase of the transmitted current pulse, the longer the transmitted current pulse is switched by the control and evaluation unit.

4. The inductive proximity sensor in accordance with claim 1, wherein the length of the transmitted current pulse amounts to between 5 µs and 750 µs.

5. The inductive proximity sensor in accordance with claim 1, wherein the control and evaluation is configured to carry out an integration of the reference transmitted current pulse.

6. The inductive proximity sensor in accordance with claim 1, wherein the inductive proximity sensor has a further coil that is coupled by a transformer to the coil, with the further coil serving for the measurement of the coil current of the coil.

7. The inductive proximity sensor in accordance with claim 1, wherein the control and evaluation unit is configured to evaluate the coil current and, starting from the evaluation, the control and evaluation unit is configured to determine the metallic material of the object.

8. The inductive proximity sensor in accordance with claim 1, wherein the inductive proximity sensor has a first coil as the transmitter coil and a second coil as the receiver coil, with the transmitted current pulse flowing through the transmitter coil and the resulting pulse voltage of the voltage pulse being measured at the receiver coil.

9. The inductive proximity sensor in accordance with claim 1, wherein the control and evaluation unit is configured to evaluate the scan values of at least two consecutive voltage pulses for a formation of the object determination signal of a metallic object.

10. The inductive proximity sensor in accordance with claim 1, wherein an analog to digital converter is provided for the scanning of the voltage pulse or a time to digital converter is provided for the scanning of the voltage pulse.

11. The inductive proximity sensor in accordance with claim 1, wherein an amplifier is provided between the coil and an analog to digital converter for the impedance conversion and the level adaptation.

12. The inductive proximity sensor in accordance with claim 1, wherein at least the coil and the control and evaluation unit are arranged in a metal housing, with at least one end face having the coil having a metallic end face that is connected to a metallic jacket.

13. The inductive proximity sensor in accordance with claim 1, wherein the control and evaluation is configured to make use of a plurality of scan values from at least one voltage pulse for the calculation of an object property.

14. The inductive proximity sensor in accordance with claim 1, wherein the control and evaluation unit is configured to carry out a digital integration in a time window from or after the start of the voltage pulse or current transmitted current pulse to generate the object determination signal.

15. The inductive proximity sensor in accordance with claim 1, wherein the control and evaluation unit is configured to evaluate a pulse level, a pulse length, and/or zero crossings of the voltage pulse, whereby the control and evaluation unit is configured to form the object determination signal.

16. A method of detecting an object using an inductive proximity sensor having at least one coil, wherein at least one transmitted current pulse is applied to the coil by a control and evaluation unit and the control and evaluation unit outputs an object determination signal, wherein the control and evaluation unit scans at least one induced voltage pulse that has been generated by the transmitted current pulse at the coil in a plurality of sections from or after the time of the application of the transmitted current pulse and forms scan values, whereby the voltage pulse is digitized, wherein the control and evaluation unit evaluates the scan values for an object detection of a metallic object, characterized in that the control and evaluation unit scans the transmitted current pulse that has been generated at the coil in at least two sections from or after the time of the application of the transmitted current pulse and forms transmitted current scan values, with the control and evaluation unit determining a rise in the current increase of the transmitted current pulse from the transmitted current scan values, and the control and evaluation unit ending the transmitted current pulse in dependence on the detected increase of the transmitted current pulse.

\* \* \* \* \*